United States Patent [19]

Wiik et al.

[11] Patent Number: 4,562,343

[45] Date of Patent: Dec. 31, 1985

[54] RECODABLE ELECTRONIC LOCK

[75] Inventors: Tore H. Wiik; Arild Pettersen; Thorstein Tønnesson, all of Moss, Norway

[73] Assignee: TrioVing A/S, Norway

[21] Appl. No.: 525,227

[22] Filed: Aug. 22, 1983

[30] Foreign Application Priority Data

Sep. 2, 1982 [NO] Norway ................................ 822966

[51] Int. Cl.[4] ................................................ G06K 5/00

[52] U.S. Cl. .................................... 235/382.5; 70/263; 235/492

[58] Field of Search ................ 235/382, 382.5; 70/263

[56] References Cited

U.S. PATENT DOCUMENTS

| | | | |
|---|---|---|---|
| 3,781,805 | 12/1973 | O'Neal . | |
| 3,821,704 | 6/1974 | Sabsay | 235/382.5 |
| 3,984,658 | 10/1976 | Cannon | 70/263 X |
| 4,213,118 | 7/1980 | Genest et al. | 235/382.5 |
| 4,411,144 | 10/1983 | Aydin | 70/278 |

FOREIGN PATENT DOCUMENTS

| | | |
|---|---|---|
| 44630 | 1/1982 | European Pat. Off. . |
| 429884 | 6/1980 | Sweden . |
| 1456138 | 11/1976 | United Kingdom . |
| 1467891 | 3/1977 | United Kingdom . |
| 1506698 | 4/1978 | United Kingdom . |
| 2078848 | 1/1982 | United Kingdom . |

*Primary Examiner*—David L. Trafton
*Attorney, Agent, or Firm*—Lucas & Just

[57] ABSTRACT

Recodable electronic lock where the coding unit which contains the code and/or other readable information preferably is removed from the lock after the recoding operation. The lock is coded by help of input of information and brought to accept recoding to any code member in a series of code members and is valid until a new, previously not utilized code member in this series is introduced whereupon the lock is automatically recoded to this new code so that the previously employed code member(s) are no longer accepted. The lock is then recoded to accept a new code series by employment of a new appropriately coded recoding member which contains readable information about the code(s) of the different code members in the new series. The potentially valid code series are stored in a memory unit in the lock.

8 Claims, 7 Drawing Figures

RECODABLE ELECTRONIC LOCK

Figure 1:
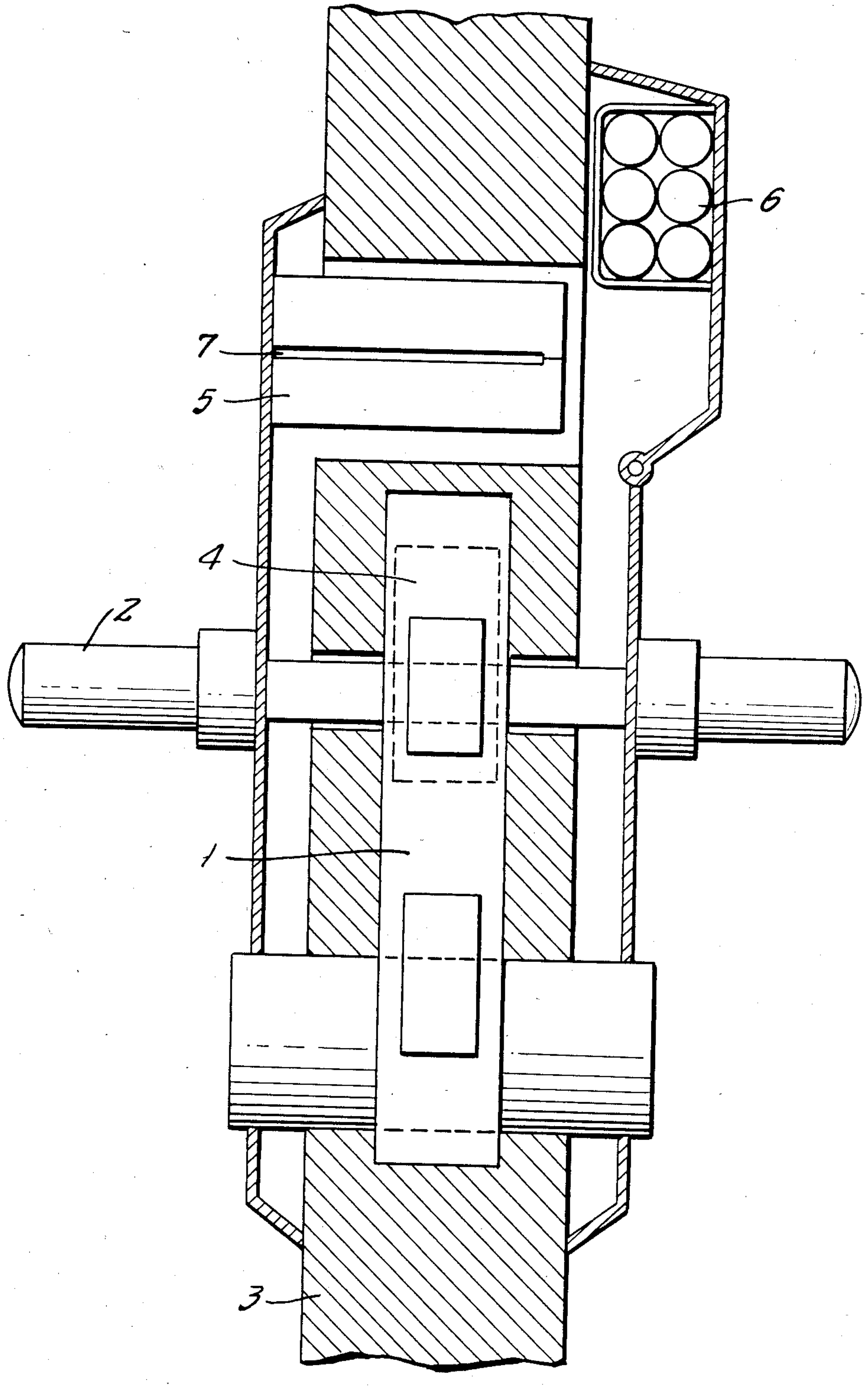

The present invention relates to a recodable electronic lock of that type where the lock code can be coded by means of a recoding member which contains a code and/or other readable information. The invention further relates to a key member to be employed in connection with such recodable electronic lock together with a recoding member for recoding of the recodable electronic lock. The invention does further relate to a method for recoding of electronic locks. The lock is preferably of such type where the recoding member is removed from the lock after the recoding operation. Particularly, but not exclusively, the invention is suitable for use in connection with hotels, business buildings etc. where it for security reasons is desirable to be able to change the different lock combinations frequently in order to make unauthorized opening of the locks difficult.

In hotels it is not unusual that the guests bring with them their key by departure or that the key disappear in other ways. The same demand may of course also be present in other institutions and under other circumstances. By locks of this type there is therefore required a system where recoding of the locks to the greatest possible extent can be carried out independently of the attendants and without being dependent on recoding from a central spot by means of cables etc. Further, there is also required a solution which to greatest possible extent limits the possibilities for unauthorized opening of the lock. It is also required a solution according to which the recoding to the greatest possible extent can be carried out by that guest or that person which has received a valid key card so that the recording can be carried out without being dependent on the attendants or on a central recoding unit. The lock system should further be so secure that a previously delivered key no longer can be used in the lock if the latter has been recoded to a new code.

There are known locks which take care of these requirements. It has for instance previously been suggested to use mechanical locks in which the recoding is carried out at the door by the hotel attendants. Such a lock comprises a lock case, a locking bolt and blocking pins which by means of a plate shaped key member can be moved within bores which are perpendicular to the plate shaped key member. The blocking pins are moveably arranged between two positions in which they prevent/allow relative movement between the locking bolt and the lock case. The combination of the lock is operated by a substantially platelike key member which is removeably inserted into the lock case and which actuates the position of the blocking pins in the respective borings. The lock is actuated by a substantially platelike key member which is equipped with a code adapted to the code of the inserted code member. The blocking pins are thus affected mechanically by the code member and/or key member. The code member and the key member are equipped with through-holes which are arranged in a matrix corresponding to the bores of the locking bolt where the holes of the key member form a supplement to the bores of the code member so that they together form a complete matrix. Insertion of a key member which is correctly coded in relation to the code of the coding member will result in abolishment of the locking effect of the blocking pins.

It has further been proposed to use electrically based systems and especially electronic locks are used to a certain extent. It has for instance been proposed to use an electronic lock in which the code can be changed automatically so that is is not necessary for the attendants to do this manually at the door. This is obtained by the fact that the locking codes only can be changed in a certain numerical sequence, so that that key which is used must contain as well a new as an old code. By change of codes the new key to which the code shall be changed must also contain the code of the previous key. If this criterium is not satisfied, the electronic memory of the lock will not be activated. This known mode of operation can most easily be explained by means of an example:

One key can for instance contain code 1 and code 2, the next key contains code 2 and code 3, and the next key code 3 and code 4 and so on. When a key containing for instance code 3 and 4 is delivered to a new hotel guest and the guest inserts this key in the lock of his room then the electronic sensors of the key will read the code 4, provided that it knows code 3 from the previously used key. In such case the key will automatically recode itself to code 4 and remove code 3 from its memory. However, if the new key does not contain a code which the lock regonizes, the code will remain unchanged. This implies in practical operation that one cannot skip any code in the numerical sequence. The result is that the hotel must be equipped with a central computer with memory or similar arrangement which stores the used codes and which issues keys in a sequence. If there should be issued one key which is not in use the lock in question must be operated manually to get into "due order" in the code sequence. The central computer and the key producer constitutes a significant investment for the hotel, simultaneously as the mentioned conditions involve great drawbacks for the user.

An electronically governed lock does in principle comprise three units, i.e. the electronic governing- and controlling unit, one electromechanical unit and a blocking unit or other mechanical unit where the electronic governing- and controlling unit can be compared to the cylinder in a traditional lock. It operates on data which are supplied from the key or in other ways. In addition data relating to details in the lock case as for instance the lever position must be treated. The primary function is to submit an opening, respectively a locking signal to the blocking arrangement of the lock. The unit must be supplied with some sort of electric energy in order to operate.

The electromechanical unit receives its entrance signals from the electronical unit. This forms a link between the electronical part and the purely mechanical blocking arrangement. This unit will typically be some sort of electromotor. The blocking arrangement is activated from the electronics through the electromechanical unit. The blocking can for instance consist in blocking of the locking member or movement of the locking bolt. The blocking arrangement is protected by a lock case.

It is natural to distinguish between on-line and off-line electronic locks. The on-line type is connected to a central control unit or a computer unit which governs the locks based on information from the locks, and possibly other information from an operation terminal or similar. This system makes possible a central storing of all valid key codes and identification of each key.

The off-line type consists of independent units. They can possibly co-operate with a key making machine which contains information about which codes are valid for the different locks. An off-line lock will normally be recodable by a direct operation on the lock.

The present invention relates to a lock of the so called "off-line" type and the inventions aims at highest possible elimination of those drawbacks which are connected with recodable electronic locks so that the lock in a simple way can be instructed to recoding independent of a previously determined sequence of codes and keys, and without the necessity of central code memory. Futher, the present invention eliminates the central computer unit.

According to the invention this is made possible by the fact that the lock is coded by supply of information so that the lock can be forced to accept recoding to any code element in a series of code elements, the previously used code element(s) in this series being valid until a new previously not used code element in this series is used, whereupon the lock will automatically be recoded to the new code so that the previously used code element(s) no longer are accepted.

The lock can with advantage be recoded to accept a new series of code elements by using a new suitably coded recoding element which contains readable information about the code(s) of the different elements in the new series. After having read the recoding element the lock calculates a number of potentially valid series codes according to a given algorhitm, which number of potentially valid series codes is equal to the elements in a series. The potentially valid series codes are then stored in the memory of the lock.

When the recoding element has been inserted into the lock the lock is preferentially recoded automatically by means of a valid key member which has not previously been used in the codes series. The invention further comprises a key member which contains a room code and a series code, the key member in this series consisting of a number of cards which corresponds to the number of codes which the lock will remember in connection with the recoding by means of the recoding card and which has a fixed room code but different predetermined series codes.

According to the present invention there is procured a recoding member which contains information which establishes the series codes in the memory of the lock for that series of key members which is to be used. The recoding member can only be utilized once for each establishment of a new series. By recoding the lock is brought into recoding position by insertion of a recoding member into the lock. The recoding member can be a punched hole card, similar to the key cards, but with a code which will make it possible for the lock to generate the series of valid codes. This recoding card is also called the initiation card. The recoding members contains a code which has the effect that there for a predetermined number valid series codes for this recoding card are calculated a given algorhitm which is stored in the memory of the lock, whereupon the recoding member preferably is removed. Later on the lock is recoded each time a valid, previously not used key card in the actual card series is inserted, simultaneously as the previously used codes are removed from the memory. Further security is obtained by demanding that a contact member as for instance a micro switch mounted on a cylinder lock and protected by another lock must be operated manually to allow the lock to enter into recoding position.

Figure 3:
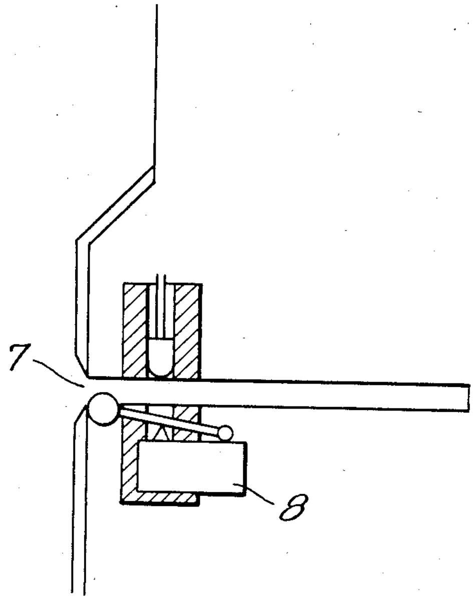
Figure 4:
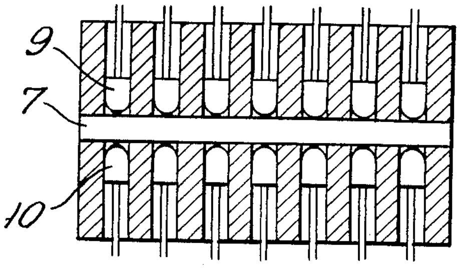
Figure 2:
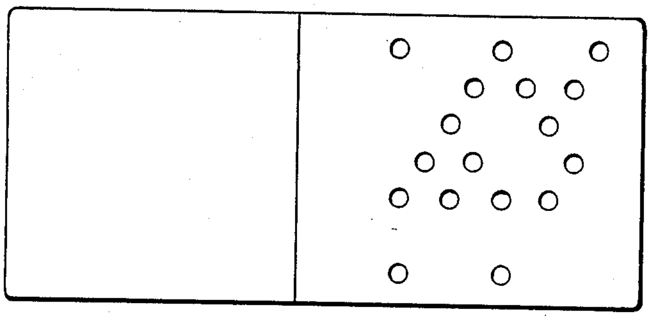

One preferred embodiment of the present invention will be closer described with reference to the figures in which FIG. 1 shows a vertical section through a door with a mounted lock, and FIG. 2 shows a key card, while FIGS. 3 and 4 show sections through the reader of the lock, FIG. 5 shows in principle a flow diagram for the operation of the lock.

Figure 6:
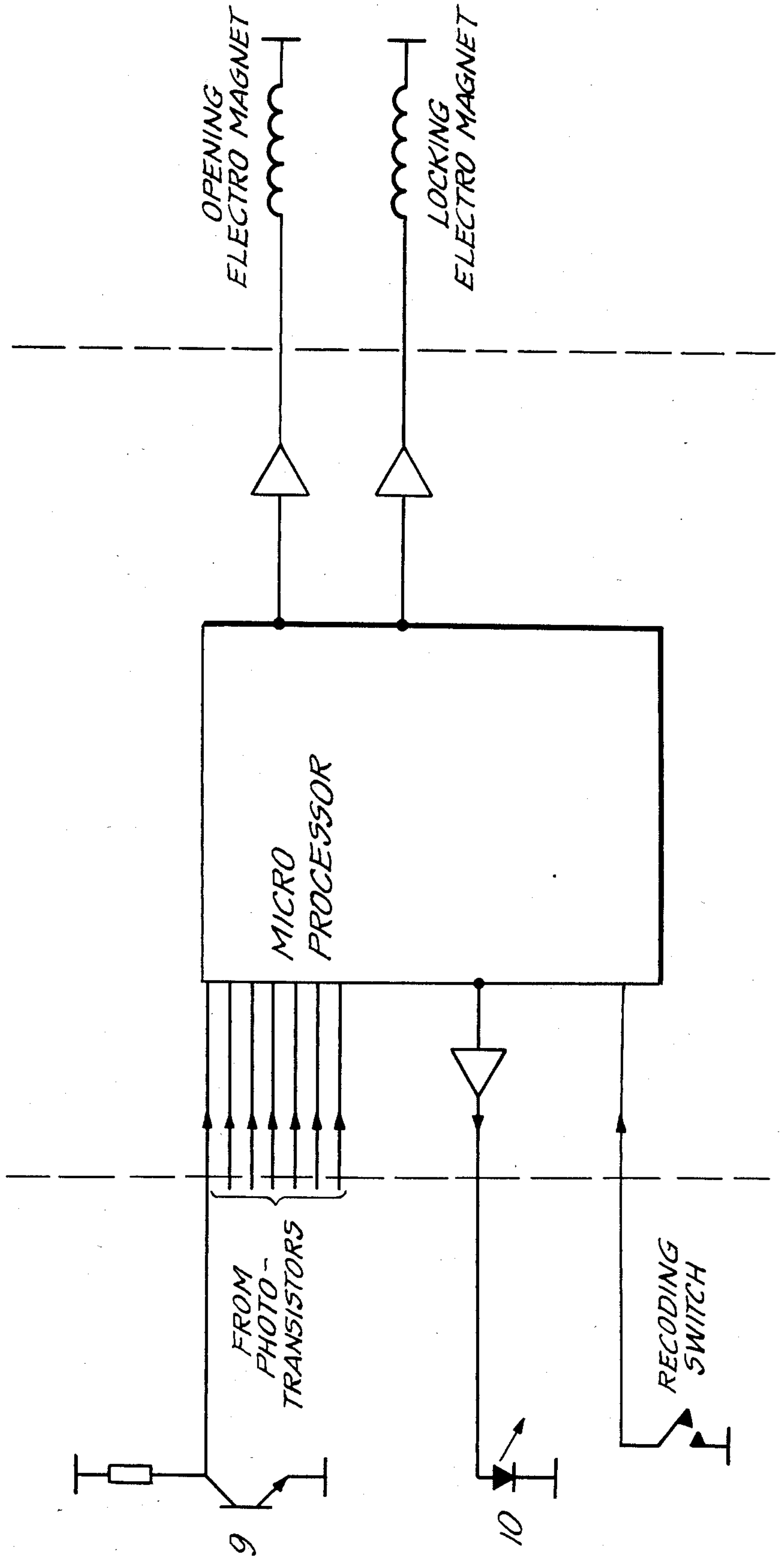

FIG. 6 shows in block schematic form a typical electronic circuitry that may be used.

In FIG. 1 the mechanical part of this lock which is a traditional, previously known lock is indicated by 1. The lever 2 on the outer side of the door 3 is also of traditionally known type. The mechanism of the lever contains however a blocking arrangement 4 which can be disengaged by an electrical impulse to an electomagnet. Without this impulse the lever will be locked and the locking member can only be operated by means of the cylinder lock. The lever can also be disengaged and engaged by means of a magnetic clutch. The blocking member 4 and the electronic governing unit 5 are supplied with energy from a current source 6 which can consist of batteries. 7 indicates the slot into which the key card is inserted when the lock shall be operated.

The key card on FIG. 2 is made of a plate shaped material where the code is given by a pattern of holes. The key card contains principally a number, for instance 32, of binary code points which shall be coded mechanically, electrically, magnetically or in other ways. The binary code points are according to the invention assumed to be divided into two zones, room code and series code with arbitrary location.

FIGS. 3 and 4 show as mentioned a section through the reader of the lock. When the key card is inserted into the slot it will first act on the switch 8 which will initiate supply of current to that part of the electronic unit which is not supplied continuously. The head of the card will then be read as the card is gradually inserted. On FIG. 4 is indicated reading by means of photo transistors 9 and optical diodes 10.

FIG. 5 illustrates a flow diagram for recoding the lock to establish the series code in the memory of the lock for that series of key members which is to be used. As described hereinabove, the recoding is carried out by means of a recoding member that supplies information to the lock as by means of a pattern of punched holes. Recoding of the lock from the pattern of punched holes may be carried out mechanically, electrically, magnetically or in any other conventional manner as for example by the typical electronic circuitry shown in FIG. 6. As there shown, a conventional micro-processor is employed for generating a list of valid series codes. More specifically, there are 7 reader I/O ports, each being connected to one phototransistor (9) in the reader module (10). There is one transmit I/O port connected to the LED in the reader module and one recording I/O port to sense the recoding switch which upon activation will set the electronics in known manner into condition to accept encoding by the recoding member. There are two lock and unlock I/O ports which activate the locking electromagnet and the opening electromagnet both being located in the lock case.

We claim:

1. A method for coding of an electronic lock of the type where the lock is recoded by accepting a new valid key element simultaneously with the validity of a preceding key element being cancelled, characterized in that the lock is coded by a recoding element to retain a series of different key element codes by reading in of code element information, the key codes of said series being potentially valid to actuate the lock until a previously not used new key element having any unused code in the said series of key element codes is inserted in the lock, the lock then automatically cancelling the previously used key code of the key element in the series and being recoded to the new key element code, in order that the previously used key element(s) no longer are accepted or can influence the lock.

2. A method according to claim 1, characterized in that the lock is recoded in order to accept and retain a new series of key element codes by using a new correspondingly coded coding element containing readable information about the new code(s) on various key elements in the new series.

3. A method according to claim 1, characterized in that the lock after reading of the code element read-in information calculates a number of potentially valid series codes, which number corresponds to the number of key elements in a series, e.g. 32.

4. A method for coding of an electronic lock of the type where the lock is recoded by accepting a new valid key element simultaneously with the validity of a preceding key element being cancelled, characterized in that the lock is coded by means of read-in of code element information and thereby is set to cancel the key code of a preceding key element in a series of key elements, the key codes of the series being valid until a previously not used new key element is inserted in the lock, the lock then automatically cancelling the previously used key code of the key element in the series and being recoded to the new code, in order that the previously used key element(s) no longer are accepted or can influence the lock and being further characterized in that potentially valid series codes are stored in a memory in the lock.

5. A method according to claim 1, characterized in that the lock after insertion of the coding element automatically cancels the last used key-code upon insertion in the lock of a valid key element which has not previously been used in the coded series.

6. A method according to claim 4, characterized in that the lock ater insertion of the coding element automatically cancels the last used key-code upon insertion in the lock of a valid key element which has not previously been used in the coded series and being further characterized in that coding element is set in the coding state by influencing a cylinder lock operated contact device on the lock, which cylinder lock operated contact device preferably is manually operated by inserting a suitable key in the cylinder lock.

7. A key element for use in connection with an electronic lock of the type where the lock is recoded by accepting a new valid key element code simultaneously with the preceding key element code being cancelled, characterized in that the lock is coded to a room code and to a series of key element codes and in that the key element contains said room code and a series code, the key element being any selected one in a series of a number of key elements in the form of key cards corresponding to the number of codes in said series which the lock memorizes in connection with the coding to a fixed room code, but different, predetermined series codes.

8. A coding element for coding of an electronic lock of the type where the lock is recoded by accepting a new valid key element simultaneously with the preceding key element code being cancelled, characterized in that the coding element contains a code or other readable information and is intended to be removed from the lock after the coding, and that the coding element contains information establishing series codes in the lock memory for the series of key elements to be used, the coding element being able to be used only once for each establishment of a new series.

* * * * *

UNITED STATES PATENT AND TRADEMARK OFFICE
CERTIFICATE OF CORRECTION

PATENT NO. : 4,562,343

DATED : December 31, 1985

INVENTOR(S) : Tore H. Wiik et al.

Figure 5A:
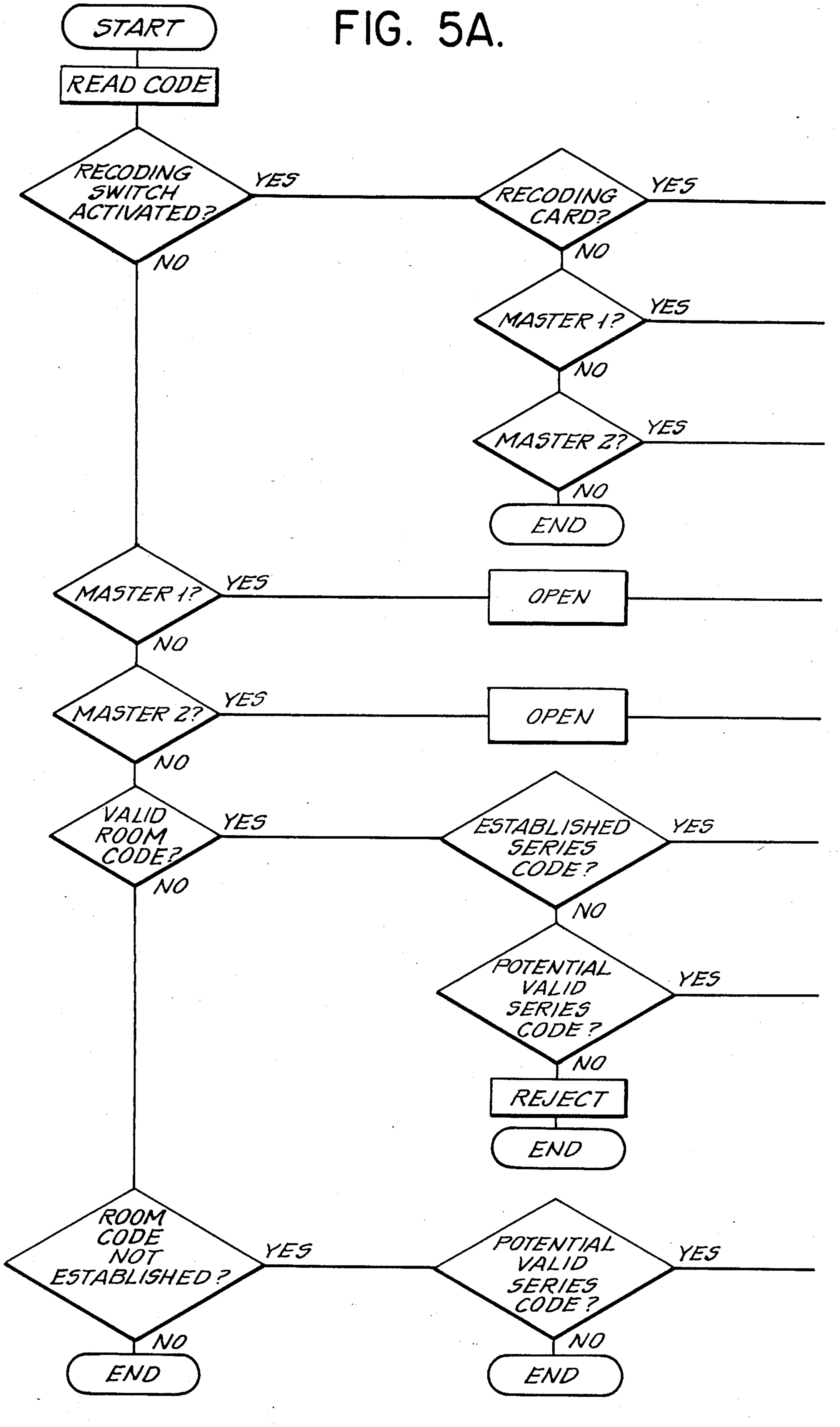
Figure 5B:
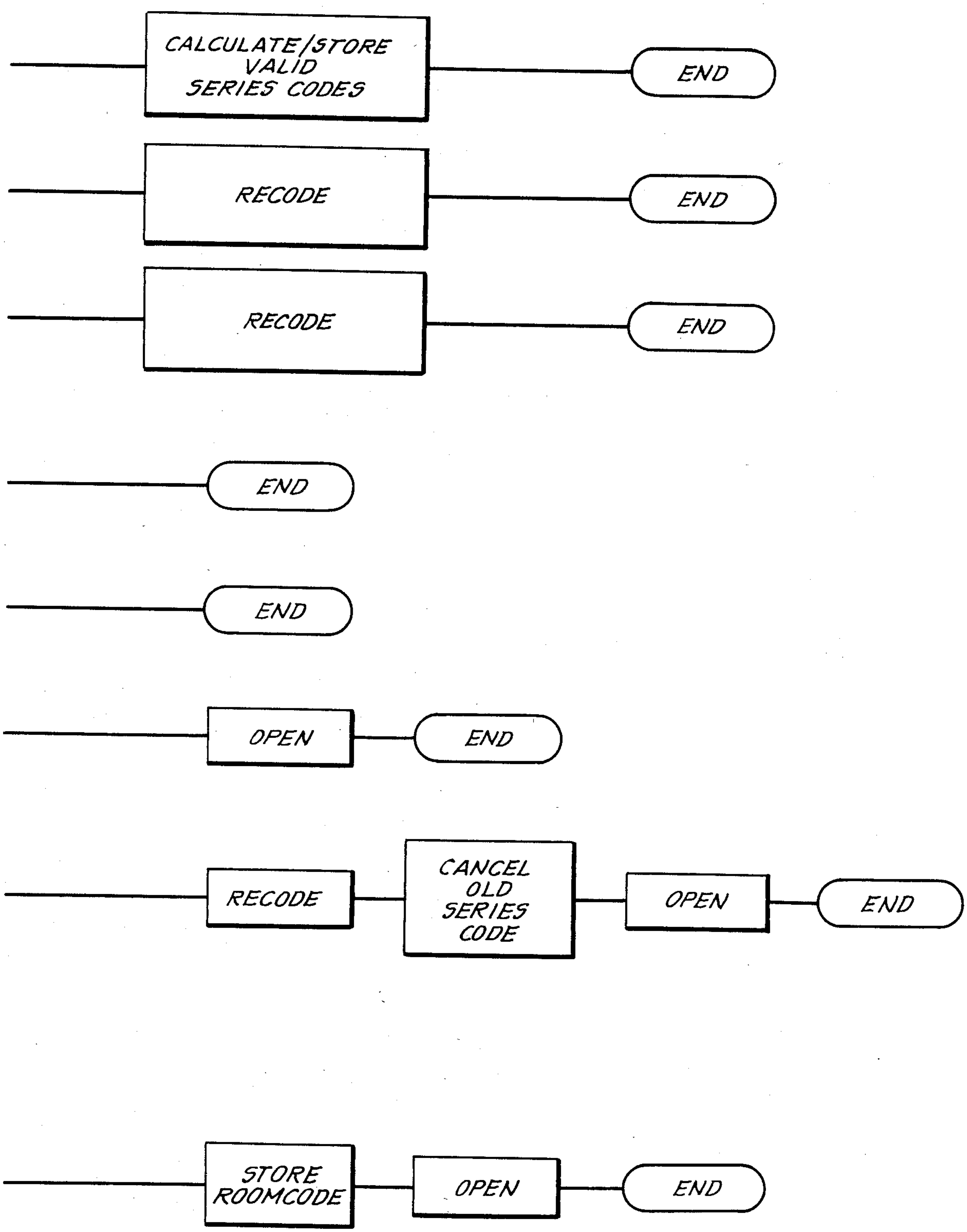

It is certified that error appears in the above-identified patent and that said Letters Patent is hereby corrected as shown below:

Column 4, line 11, "FIG. 5 shows" should be changed to --FIGS. 5A and 5B show--.

Column 4, line 45, "FIG. 5 illustrates" should be changed to --FIGS. 5A and 5B illustrate--.

Claim 6, line 6, change "coding element" to --the lock--.

Signed and Sealed this

*Twentieth* Day of *May 1986*

[SEAL]

*Attest:*

DONALD J. QUIGG

*Attesting Officer*

*Commissioner of Patents and Trademarks*